US009432428B2

(12) United States Patent
Werkelin Ahlin et al.

(10) Patent No.: US 9,432,428 B2
(45) Date of Patent: *Aug. 30, 2016

(54) METHODS AND SYSTEMS FOR DYNAMIC CREATION OF HOTSPOTS FOR MEDIA CONTROL

(71) Applicant: Spotify AB, Stockholm (SE)

(72) Inventors: Oskar Werkelin Ahlin, Solna (SE); Karl Sigfrids, Hagersten (SE); Per Eckerdal, Solna (SE); Richard Titmuss, Ipswich Suffolk (GB); Evan Shrubsole, Stockholm (SE); Jamie Kirkpatrick, Stockholm (SE)

(73) Assignee: SPOTIFY AB, Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 14/817,083

(22) Filed: Aug. 3, 2015

(65) Prior Publication Data

US 2016/0191590 A1   Jun. 30, 2016

Related U.S. Application Data

(63) Continuation of application No. 14/668,732, filed on Mar. 25, 2015, now Pat. No. 9,112,849.

(60) Provisional application No. 62/099,045, filed on Dec. 31, 2014.

(51) Int. Cl.
*H04L 29/06* (2006.01)
*G06F 3/00* (2006.01)
(Continued)

(52) U.S. Cl.
CPC .............. *H04L 65/60* (2013.01); *G06F 3/00* (2013.01); *H04L 63/08* (2013.01); *H04L 63/10* (2013.01); *H04N 21/25816* (2013.01); *H04N 21/43615* (2013.01); *H04N 21/6334* (2013.01)

(58) Field of Classification Search
CPC ........ H04L 63/08; H04L 63/10; H04L 65/60
See application file for complete search history.

(56) References Cited

U.S. PATENT DOCUMENTS 7,682,028 B2    3/2010   Maeda et al.
7,873,988 B1 *  1/2011   Issa .......................... G06F 21/10
                                                        726/26
(Continued)

FOREIGN PATENT DOCUMENTS

EP        1564621 A1    8/2005
EP        2677757 A2   12/2013

OTHER PUBLICATIONS

Ahlin, Notice of Allowance, U.S. Appl. No. 14/668,732, Jun. 9, 2015, 12 pgs.

(Continued)

*Primary Examiner* — Saleh Najjar
*Assistant Examiner* — Oleg Korsak
(74) *Attorney, Agent, or Firm* — Morgan, Lewis & Bockius LLP

(57) ABSTRACT

Methods, systems, and/or devices for controlling media presentation at a shared media presentation system are described herein. In one aspect, a first electronic device detects user input requesting to indicate availability of a media presentation system for use by one or more other electronic devices. In response to detecting the user input, the first electronic device transmits an indication of availability of the media presentation system for use by the one or more other electronic devices. The first electronic device also receives, from a second electronic device of the one or more other electronic devices, a request for access to the media presentation system. In response to receiving the request, the first electronic device transmits, to the second electronic device, an authentication token that allows the second electronic device to access the media presentation system through submission of media control requests that include the authentication token.

18 Claims, 10 Drawing Sheets

(51) Int. Cl.
*H04N 21/258* (2011.01)
*H04N 21/436* (2011.01)
*H04N 21/6334* (2011.01)

(56) References Cited

U.S. PATENT DOCUMENTS

| | | | |
|---|---|---|---|
| 8,027,634 B1 | 9/2011 | Warner et al. | |
| 8,145,532 B2 | 3/2012 | Jones et al. | |
| 8,296,675 B2 | 10/2012 | Falchuk | |
| 8,838,730 B2 | 9/2014 | Ishii | |
| 2004/0103312 A1* | 5/2004 | Messerges | G06F 21/10 726/10 |
| 2004/0235521 A1 | 11/2004 | Pradhan et al. | |
| 2005/0036509 A1 | 2/2005 | Acharya et al. | |
| 2006/0173974 A1 | 8/2006 | Tang | |
| 2006/0258289 A1 | 11/2006 | Dua | |
| 2007/0085846 A1* | 4/2007 | Yang | G09G 5/00 345/204 |
| 2008/0051025 A1* | 2/2008 | Casati | H04L 12/1877 455/3.01 |
| 2008/0212944 A1 | 9/2008 | Khedouri et al. | |
| 2008/0313264 A1 | 12/2008 | Pestoni | |
| 2008/0320543 A1* | 12/2008 | Wang | H04N 7/162 725/131 |
| 2009/0217036 A1 | 8/2009 | Irwin et al. | |
| 2012/0158531 A1 | 6/2012 | Dion et al. | |
| 2012/0311444 A1* | 12/2012 | Chaudhri | G06F 3/04883 715/716 |
| 2013/0139271 A1 | 5/2013 | Arrelid et al. | |
| 2013/0225081 A1* | 8/2013 | Doss | H04W 4/206 455/41.2 |
| 2013/0231044 A1 | 9/2013 | Wang | |
| 2014/0029921 A1 | 1/2014 | Warren et al. | |
| 2014/0059644 A1 | 2/2014 | Shin et al. | |
| 2015/0150110 A1* | 5/2015 | Canning | H04L 63/08 726/9 |

OTHER PUBLICATIONS

Spotify AB, Extended European Search Report, EP15183490.0, Nov. 2, 2015, 9 pgs.
Ahlin, Notice of Allowance, U.S. Appl. No. 14/883,413, Feb. 2, 2016, 11 pgs.

* cited by examiner

METHODS AND SYSTEMS FOR DYNAMIC CREATION OF HOTSPOTS FOR MEDIA CONTROL

RELATED APPLICATIONS

This application is a continuation of U.S. patent application Ser. No. 14/668,732 filed Mar. 25, 2015, which claims priority to U.S. Provisional Application No. 62/099,045, filed Dec. 31, 2014, each of which is hereby incorporated by reference in its entirety.

TECHNICAL FIELD

The disclosed implementations relate generally to media content delivery and, in particular, to controlling media presentation at a shared media presentation system.

BACKGROUND

At social gatherings, users often wish to share media content with friends, relatives, and new acquaintances. For example, a party host may access media content on a mobile device and present that media content through a media presentation system (e.g., play music on a speaker or stream video on a screen). Other users (e.g., guests) may wish to control the media presentation system, and the host may be willing to provide this access (e.g., to allow the other users to share in the selection of media content). Allowing other users access to the media presentation system on a one-by-one basis (e.g., connecting the other users' devices to the media presentation system one at a time) is slow and impedes the goal of sharing access to the media presentation system. Moreover, due to access or license restrictions, the party host's mobile device might be the only device authorized to control the media presentation system. Passing around the host's mobile device is also impractical and may be undesirable for privacy and security reasons. Thus, users are faced with the challenge of how to effectively, efficiently, and securely share access to media presentation systems.

SUMMARY

Accordingly, there is a need for systems and methods for sharing access to a media control system and controlling media presentation at a shared media presentation system. By authorizing a first electronic device to control a media presentation system and then allowing the first electronic device to indicate availability of the media presentation system for use by one or more other electronic devices, users are able to more efficiently, effectively, and securely share access to a media presentation system. Such systems and methods optionally complement or replace conventional methods for controlling media presentation systems.

One specific area where the disclosed systems and methods are implemented is creating hotspots for media control during social gatherings (e.g., parties, music festivals, etc.). For example, a host of a social gathering will use a device associated with the host to create a hotspot that allows guests to use the host's media presentation system(s) (e.g., one or more network-connected speakers). Such a request can be made in many ways, such as via a mobile phone (e.g., smart phone), a tablet computer, a laptop computer, another mobile device, a desktop computer, or other electronic device. For example, the host can use a smart phone to request to share access to a speaker located within the dining room via an application on the smart phone that communicates with a media content server. Once the media content server receives the request, the media content server generates an authentication token for the media presentation system and sends the authentication token to the host's smart phone. After connecting to the hotspot, including receiving an authentication token from the host's smart phone or receiving the authentication token from the media content server, the host's guests are able to use the media presentation system. The guests are able to use their own electronic (e.g., mobile) devices to send media control requests (e.g., requests to stream music content) to the media presentation system (e.g., the media control requests are sent to the media content server and the media content server then sends a command corresponding to the media control request to the media presentation system). In this way, the host and his or her guests are able to collaborate on the presentation of content during the social gathering.

The above example represents one possible way of controlling media presentation at a shared media presentation system. Other implementations are also contemplated, however (as discussed in more detail below within the detailed description).

EXAMPLE IMPLEMENTATIONS

In accordance with some implementations, a method is performed at a server system (e.g., a media content server) having one or more processors and memory storing one or more programs for execution by the one or more processors. The method includes authorizing a first electronic device associated with a first user to control a media presentation system (e.g., a single speaker or a plurality of speakers that are associated with the first user); receiving, from the first electronic device, a request to indicate availability of the media presentation system for use by one or more other electronic devices; and sending, to the first electronic device, an authentication token for the media presentation system. The method further includes receiving, from a second electronic device, a media control request including the authentication token, wherein the second electronic device is one of the one or more other electronic devices. In accordance with a determination that the authentication token permits access to the media presentation system, the method further includes sending a command corresponding to the media control request to the media presentation system.

In accordance with some implementations, a server system for controlling media presentation includes one or more processors and memory storing one or more programs configured for execution by the one or more processors. The one or more programs include instructions for performing the operations of the server-side method described above. In accordance with some implementations, a non-transitory computer-readable storage medium is provided. The computer-readable storage medium stores one or more programs configured for execution by one or more processors of the server system; the one or more programs include instructions for performing the operations of the server-side method described above. In accordance with some implementations, a server system for controlling media presentation includes means for performing the operations of the server-side method described above.

Thus, users are provided with faster, more efficient methods for controlling media presentation at a shared media presentation system, thereby increasing the effectiveness, efficiency, and user satisfaction associated with media content delivery systems.

BRIEF DESCRIPTION OF THE DRAWINGS

The implementations disclosed herein are illustrated by way of example, and not by way of limitation, in the figures of the accompanying drawings. Like reference numerals refer to corresponding parts throughout the drawings.

DETAILED DESCRIPTION

Reference will now be made to implementations, examples of which are illustrated in the accompanying drawings. In the following description, numerous specific details are set forth in order to provide an understanding of the various described implementations. However, it will be apparent to one of ordinary skill in the art that the various described implementations may be practiced without these specific details. In other instances, well-known methods, procedures, components, circuits, and networks have not been described in detail so as not to unnecessarily obscure aspects of the implementations.

It will also be understood that, although the terms first, second, etc. are, in some instances, used herein to describe various elements, these elements should not be limited by these terms. These terms are used only to distinguish one element from another. For example, a first device could be termed a second device, and, similarly, a second device could be termed a first device, without departing from the scope of the various described implementations. The first device and the second device are both devices, but they are not the same device.

The terminology used in the description of the various implementations described herein is for the purpose of describing particular implementations only and is not intended to be limiting. As used in the description of the various described implementations and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting" or "in accordance with a determination that," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]" or "in accordance with a determination that [a stated condition or event] is detected," depending on the context.

As used herein, the term "exemplary" is used in the sense of "serving as an example, instance, or illustration" and not in the sense of "representing the best of its kind."

Figure 1:
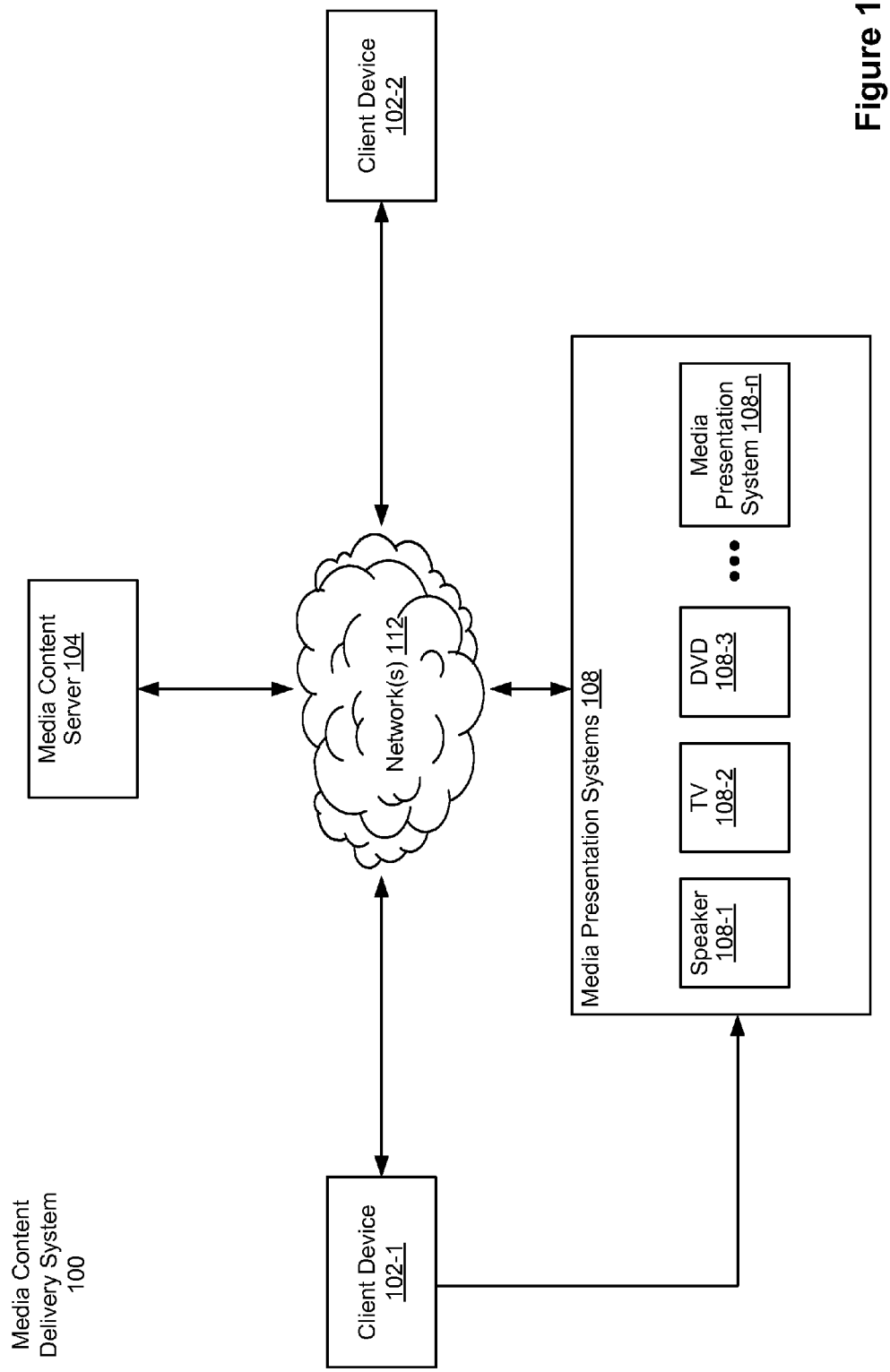
FIG. 1 is a block diagram illustrating an exemplary media content delivery system in accordance with some implementations.

FIG. 1 is a block diagram illustrating an exemplary media content delivery system 100 in accordance with some implementations. The media content delivery system 100 includes one or more client devices 102 (e.g., client device 102-1 and client device 102-2), one or more media content servers (e.g., media content server 104), and one or more media presentation systems (e.g., media presentation systems 108, including speaker 108-1, television (TV) 108-2, digital versatile disk (DVD) 108-3, and/or other media presentation system 108-n). One or more networks (e.g., network(s) 112) communicably connect each component of the media content delivery system 100 with other components of the media content delivery system 100. In some implementations, the one or more networks 112 include public communication networks, private communication networks, or a combination of both public and private communication networks. For example, the one or more networks 112 can be any network (or combination of networks) such as the Internet, other wide area networks (WAN), local area networks (LAN), virtual private networks (VPN), metropolitan area networks (MAN), peer-to-peer networks, and/or ad-hoc connections.

In some implementations, a client device (e.g. client device 102-1 and/or client device 102-2) is a representative electronic device associated with one or more users. In some implementations, a client device is any of: a personal computer, a mobile electronic device, a wearable computing device, a laptop, a tablet computer, a mobile phone, a feature phone, a smart phone, a digital media player, or any other electronic device capable of sending media control requests. In some implementations, client device 102-1 and client device 102-2 are the same type of device (e.g., client device 102-1 and client device 102-2 are both mobile devices). Alternatively, client device 102-1 and client device 102-2 are different types of devices.

In some implementations, client devices 102-1 and 102-2 send and receive information through the networks 112. For example, client devices 102-1 and 102-2, in some implementations, send media control requests (e.g., requests to play music, movies, playlists, or other media content items) to media content server 104 through network(s) 112. Additionally, client devices 102-1 and 102-2, in some implementations, also receive authentication tokens from the media content server 104 through network(s) 112. For example, client device 102-1 initially sends media control requests for a particular media presentation system 108, and client device 102-2 subsequently may also send media control requests for the media presentation system 108 after receiving an authentication token corresponding to the media presentation system 108.

In some implementations, client device 102-1 and client device 102-2 may also communicate with each other through network(s) 112. For example, client device 102-1 may notify client device 102-2 that access to a media presentation system 108 is available and/or send an authentication token to client device 102-2 using any suitable networking protocol, as described in more detail below.

In some implementations, client device 102-1 communicates directly with media presentation systems 108. As pictured in FIG. 1, client device 102-1 is able to communicate directly (e.g., through a wired connection or through a short-range wireless signal, such as those associated with BLUETOOTH/BTLE communication technologies, radio-frequency-based near field communication technologies, infrared communication technologies, etc.) with media presentation systems 108, while client device 102-2 only communicates with the media presentation systems 108 through network(s) 112. In some implementations, client device 102-1 uses the direct connection with media presentation systems 108 in order to complete initial setup and configuration operations on the media presentation systems 108. For example, media presentation systems 108 include TV 108-2 and, in some implementations, the client device 102-1 uses the direct connection to configure TV 108-2 to connect to a local wireless (e.g., WiFi) network (e.g., provide TV 108-2 with a network identifier and username and password details for the network).

Figure 2:
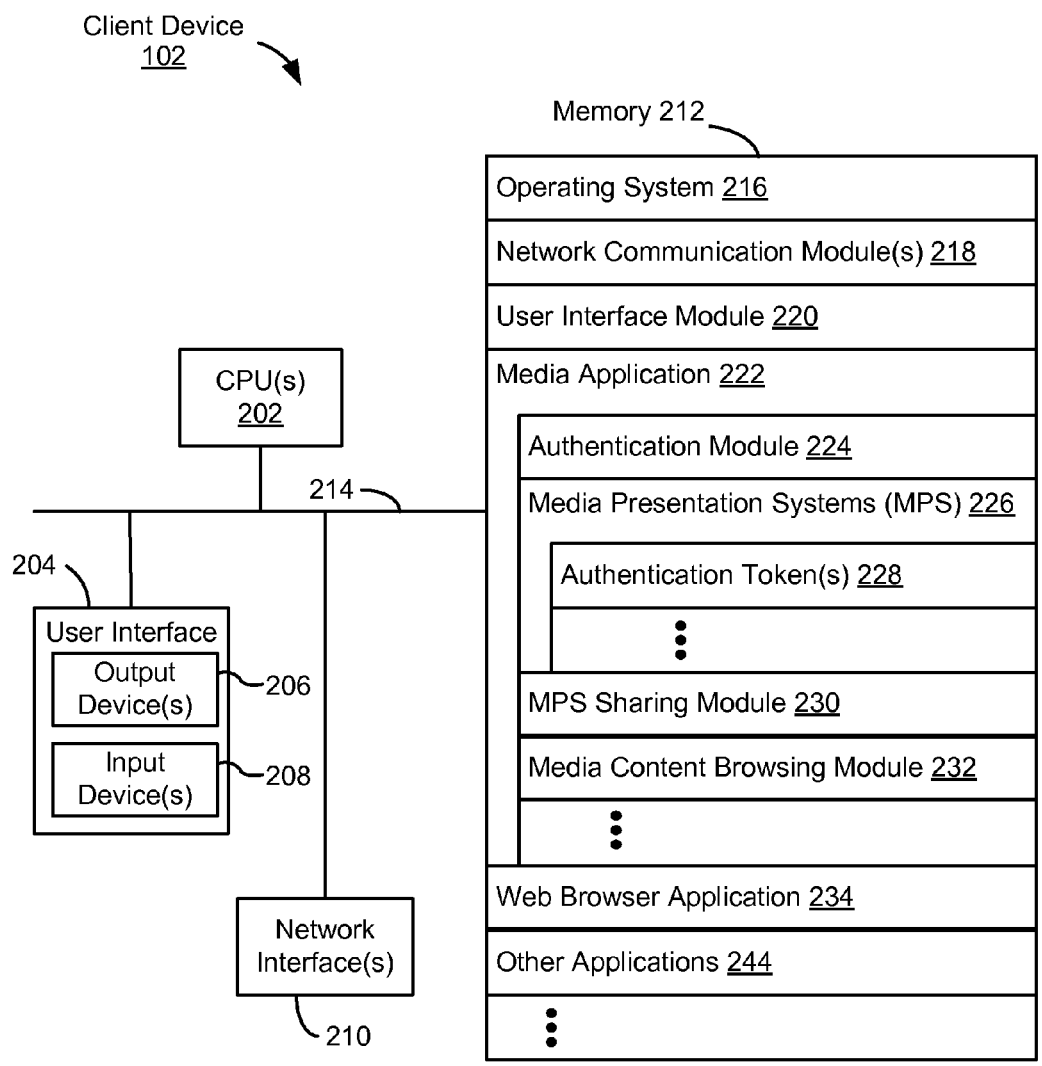
FIG. 2 is a block diagram illustrating an exemplary client device in accordance with some implementations.

In some implementations, client device 102-1 and client device 102-2 each include a media application 222 (as shown in FIG. 2 and described in more detail below) that allows a user of the client device to browse media content and request media content for presentation at a media presentation system (e.g., speaker 108-1, TV 108-2, DVD 108-3, . . . Media Presentation System 108-*n*) associated with the client device. The media presentation system, in some implementations, may be part of the client device 102, such as built-in speakers or a screen, or may be separate from the client device 102, such as a wirelessly coupled speaker (e.g., speaker 108-1).

In some implementations, the client device 102-1 further includes a media presentation sharing module 230 of media application 222 (as shown in FIG. 2 and described in more detail below). The media presentation sharing module 230 allows a user of client device 102-1, in some implementations, to indicate availability of the media presentation system for use by one or more other electronic devices (e.g., client device 102-2) and/or to provide access by the one or more other electronic devices to the media presentation system. In some implementations, the media presentation sharing module 230 allows the user of client device 102-1 to indicate availability of all or a portion of media presentation systems associated with the user (e.g., the user of client device 102-1 selects a single user interface element (such as share-all affordance 604 of FIG. 6A) to indicate availability of speaker 108-1, TV 108-2, DVD 108-3, and/or media presentation system 108-*n* for use by one or more other electronic devices).

In some implementations, the media content server 104 stores media content and provides the media content (e.g., media content requested by the media application 222 of client device 102-1 and/or 102-2), via the network(s) 112, to the media presentation systems 108. Content stored and served by the media content server 104, in some implementations, includes any appropriate content, including text (e.g., articles, blog posts, emails, etc.), images (e.g., photographs, drawings, renderings, etc.), videos (e.g., short-form videos, music videos, television shows, movies, clips, previews, etc.), audio (e.g., music, spoken word, podcasts, etc.), games (e.g., 2- or 3-dimensional graphics-based computer games, etc.), or any combination of content types (e.g., web pages that include any combination of the foregoing types of content or other content not explicitly listed). The description of the media content server 104 as a "server" is intended as a functional description of the devices, systems, processor cores, and/or other components that provide the functionality attributed to the media content server 104. It will be understood that the media content server 104 may be a single server computer, or may be multiple server computers. Moreover, the media content server 104 may be coupled to other servers and/or server systems, or other devices, such as other client devices, databases, content delivery networks (e.g., peer-to-peer networks), network caches, and the like. In some implementations, the media content server 104 is implemented by multiple computing devices working together to perform the actions of a server system (e.g., cloud computing).

As described above, media presentation systems 108 (e.g., speaker 108-1, TV 108-2, DVD 108-3, . . . Media Presentation System 108-*n*) are capable of receiving media content (e.g., from the media content server 104) and presenting the received media content. For example, in some implementations, speaker 108-1 is a component of a network-connected audio/video system (e.g., a home entertainment system, a radio/alarm clock with a digital display, or an infotainment system of a vehicle). In some implementations, media presentation systems thus are devices to which the media content server 104 can send media content. For example, media presentation systems include computers, dedicated media players, network-connected stereo and/or speaker systems, network-connected vehicle media systems, network-connected televisions, network-connected DVD players, and universal serial bus (USB) devices used to provide a playback device with network connectivity, and the like.

In some implementations, each media presentation system 108 is associated with an identifier (e.g., a unique hardware or application identifier, a network address, etc.) that the media content server 104 uses to uniquely identify and/or establish communications with the media presentation system. As described herein, in some implementations, client device 102-2 sends, through network(s) 112, a media control request (e.g., a request to play a new song) including an authentication token to media content server 104. After verifying that the authentication token is valid (described in more detail below with reference to FIGS. 4 and 5), the media content server 104, in some implementations, retrieves an identifier of a particular media presentation system 108 (e.g., TV 108-2) that is associated with the authentication token (e.g., an MPS ID from the MPS IDs field of media account data structure 404, FIG. 4, where MPS stands for media presentation system). Accordingly, in some implementations, the media content server 104 can first verify that client device 102-2 is authorized to send media control requests to a media presentation system 108 (e.g., TV 108-2) and can then send a command corresponding to the media control request to the media presentation system 108 (e.g., TV 108-2), even though the client device 102-2 is not otherwise associated with the media presentation system 108 (e.g., TV 108-2). A user of client device 102-2 thus can control media presentation at a shared media presentation system.

FIG. 2 is a block diagram illustrating an exemplary client device 102 (e.g., client device 102-1 and/or client device 102-2 of FIG. 1) in accordance with some implementations. The client device 102 typically includes one or more central processing units (CPU(s), i.e., processors or cores) 202, one or more network (or other communications) interfaces 210, memory 212, and one or more communication buses 214 for interconnecting these components. The communication buses 214 optionally include circuitry (sometimes called a chipset) that interconnects and controls communications between system components.

As also shown in FIG. 2, the client device 102 includes a user interface 204, including output device(s) 206 and input device(s) 208. In some implementations, the input devices include a keyboard, mouse, or track pad. Alternatively, or in addition, in some implementations, the user interface 204 includes a display device that includes a touch-sensitive surface, in which case the display device is a touch-sensitive display. In client devices that have a touch-sensitive display, a physical keyboard is optional (e.g., a soft keyboard may be displayed when keyboard entry is needed). The output devices (e.g., output device(s) 206) also optionally include speakers or an audio output connection connected to speakers, earphones, or headphones. Furthermore, some client devices 102 use a microphone and voice recognition device to supplement or replace the keyboard. Optionally, the client device 102 includes an audio input device (e.g., a microphone) to capture audio (e.g., speech from a user). Optionally, the client device 102 includes a location-detection device, such as a GPS (global positioning satellite) or other geo-location receiver, and/or location-detection software for determining the location of the client device 102.

Memory 212 includes high-speed random-access memory, such as DRAM, SRAM, DDR RAM, or other random-access solid-state memory devices; and may include non-volatile memory, such as one or more magnetic disk storage devices, optical disk storage devices, flash memory devices, or other non-volatile solid-state storage devices. Memory 212 may optionally include one or more storage devices remotely located from the CPU(s) 202. Memory 212, or alternately, the non-volatile memory solid-state storage devices within memory 212, includes a non-transitory computer-readable storage medium. In some implementations, memory 212 or the non-transitory computer-readable storage medium of memory 212 stores the following programs, modules, and data structures, or a subset or superset thereof:

- an operating system 216 that includes procedures for handling various basic system services and for performing hardware dependent tasks;
- network communication module(s) 218 for connecting the client device 102 to other computing devices (e.g., media presentation systems 108, media content server 104, and/or other client devices) via the one or more network interface(s) 210 (wired or wireless) connected to one or more network(s) 112 such as the Internet, other WANs, LANs, PANs, MANs, VPNs, peer-to-peer networks, content delivery networks, ad-hoc connections, and so on;
- a user interface module 220 that receives commands and/or inputs from a user via the user interface 204 (e.g., from the input devices 208, which may include keyboards, touch screens, microphones, pointing devices, eye tracking components, three-dimensional gesture tracking components, and the like), and provides user interface objects and other outputs for display on the user interface 204 (e.g., the output devices 206, which may include a computer display, a television screen, a touchscreen, a speaker, etc.);
- a media application 222 (e.g., an application associated with a media content provider, including a media player, a streaming media application, or any other appropriate application or component of an application) for browsing, receiving, processing, and presenting media content (e.g., media content streams, media content files, advertisements, web pages, videos, audio, games, etc.). The media application 222 also includes the following modules (or sets of instructions), or a subset or superset thereof:
  - an authentication module 224 for sending authentication tokens (e.g., authentication token(s) 228) corresponding to one or more media presentation systems associated with the client device 102 (e.g., one or more of the media presentation systems 108 from FIG. 1), receiving authentication tokens from other client devices, and optionally generating authentication tokens for media presentation systems associated with client device 102;
  - a media presentation system module 226 for identifying media presentations systems associated with (i.e., available for control by) the client device 102, including:
    - authentication token(s) 228 for sending to media content server 104 in order to confirm that the client device 102 is authorized to use the corresponding one or more media presentation systems (or, alternatively, authentication token(s) 228 may be sent to other client devices in order to directly share access to a media presentation system);
  - a media presentation system sharing module 230 for sending a request to indicate availability of a media presentation system for use and for controlling access to the media presentation system (e.g., creating a hotspot for media control, configuring access-control settings for the hotspot, approving requests to connect to the hotspot, etc.); and
  - a media content browsing module 232 for providing controls and/or user interfaces enabling a user to navigate, select for playback, and otherwise control or interact with media content, whether the media content is stored locally or remotely;
- a web browser application 234 (e.g., Internet Explorer by Microsoft, Firefox by Mozilla, Safari by Apple, or Chrome by Google) for accessing, viewing, and interacting with web sites; and
- other applications 244, such as applications for word processing, calendaring, mapping, weather, stocks, time keeping, virtual digital assistant, presenting, number crunching (spreadsheets), drawing, instant messaging, e-mail, telephony, video conferencing, photo management, video management, a digital music player, a digital video player, 2D gaming, 3D (e.g., virtual reality) gaming, electronic book reader, and/or workout support.

Figure 3:
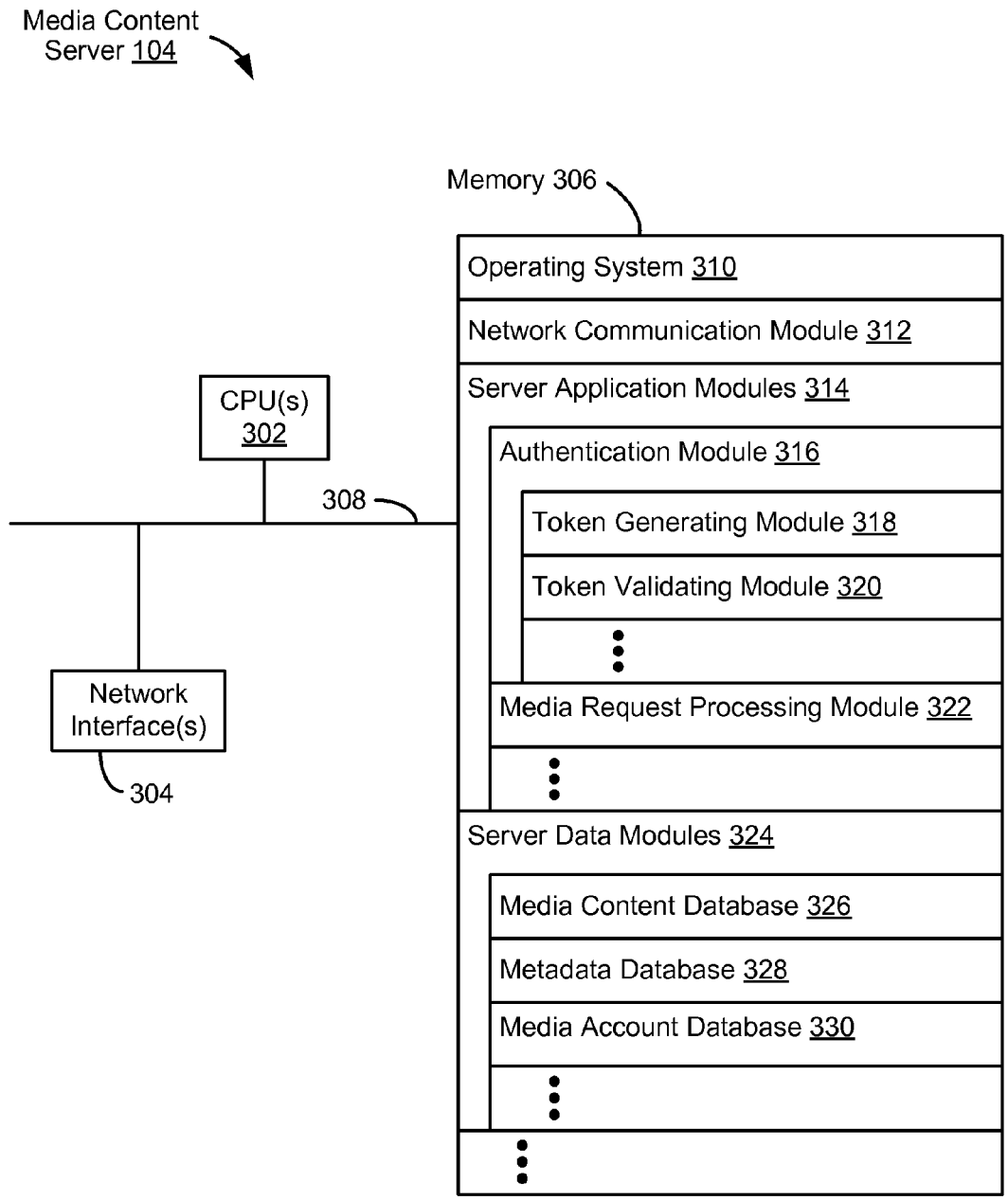
FIG. 3 is a block diagram illustrating an exemplary media content server in accordance with some implementations.

FIG. 3 is a block diagram illustrating an exemplary media content server 104 in accordance with some implementations. The media content server 104 typically includes one or more central processing units/cores (CPUs) 302, one or more network interfaces 304, memory 306, and one or more communication buses 308 for interconnecting these components.

Memory 306 includes high-speed random access memory, such as DRAM, SRAM, DDR RAM, or other random access solid-state memory devices; and may include non-volatile memory, such as one or more magnetic disk storage devices, optical disk storage devices, flash memory devices, or other non-volatile solid-state storage devices. Memory 306, optionally, includes one or more storage devices remotely located from one or more CPUs 302. Memory 306, or, alternatively, the non-volatile solid-state memory device(s) within memory 306, includes a non-transitory computer-readable storage medium. In some implementations, memory 306, or the non-transitory computer-readable storage medium of memory 306, stores the following programs, modules and data structures, or a subset or superset thereof:

an operating system 310 that includes procedures for handling various basic system services and for performing hardware dependent tasks;

a network communication module 312 that is used for connecting the media content server 104 to other computing devices via one or more network interfaces 304 (wired or wireless) connected to one or more networks 112 such as the Internet, other WANs, LANs, PANs, MANs, VPNs, peer-to-peer networks, content delivery networks, ad-hoc connections, and so on;

one or more server application modules 314 for enabling the media content server 104 to perform various functions, the server application modules 314 including, but not limited to, one or more of:

an authentication module 316 for managing authentication and/or authorization requests, the authentication module 316 including, but not limited to, one or more of:

a token generating module 318 for generating authentication tokens permitting use of media presentation systems (e.g., speaker 108-1 of FIG. 1); and a token validating module 320 for verifying that an authentication token is valid (e.g., has not yet expired or has not yet been revoked);

a media request processing module 322 for processing requests for media content and facilitating access to requested media content items by client devices (e.g., the client device 102) including, optionally, streaming media content to such devices or to one or more media presentation systems 108 (e.g., speaker 108-1, FIG. 1); and one or more server data module(s) 324 for handling the storage of and access to media content items and metadata relating to the media content items; in some implementations, the one or more server data module(s) 324 include:

a media content database 326 for storing media content items (e.g., audio files, video files, text files, etc.);

a metadata database 328 for storing metadata relating to the media content items; and a media account database 330 for storing account information for user media accounts, including user profiles, credentials (e.g., user identifiers, passwords, email addresses, etc.), credentials or identifiers of any linked accounts, and the like.

In some implementations, the media content server 104 includes web or Hypertext Transfer Protocol (HTTP) servers, File Transfer Protocol (FTP) servers, as well as web pages and applications implemented using Common Gateway Interface (CGI) script, PHP Hyper-text Preprocessor (PHP), Active Server Pages (ASP), Hyper Text Markup Language (HTML), Extensible Markup Language (XML), Java, JavaScript, Asynchronous JavaScript and XML (AJAX), XHP, Javelin, Wireless Universal Resource File (WURFL), and the like.

Each of the above identified modules stored in memory 212 and 306 corresponds to a set of instructions for performing a function described herein. The above identified modules or programs (i.e., sets of instructions) need not be implemented as separate software programs, procedures, or modules, and thus various subsets of these modules may be combined or otherwise re-arranged in various implementations. In some implementations, memory 212 and 306 optionally store a subset or superset of the respective modules and data structures identified above. Furthermore, memory 212 and 306 optionally store additional modules and data structures not described above.

Although FIG. 3 illustrates the media content server 104 in accordance with some implementations, FIG. 3 is intended more as a functional description of the various features that may be present in one or more media content servers than as a structural schematic of the implementations described herein. In practice, and as recognized by those of ordinary skill in the art, items shown separately could be combined and some items could be separated. For example, some items shown separately in FIG. 3 could be implemented on single servers and single items could be implemented by one or more servers. The actual number of servers used to implement the media content server 104, and how features are allocated among them, will vary from one implementation to another and, optionally, depends in part on the amount of data traffic that the server system must handle during peak usage periods as well as during average usage periods.

In some implementations, the media content server 104 uses tables, databases, or other appropriate data structures (e.g., authentication module 402 and/or media content database 404) to associate respective users with respective media presentation systems and to manage authentication tokens (i.e., access tokens) associated with respective media presentation systems.

Figure 4:
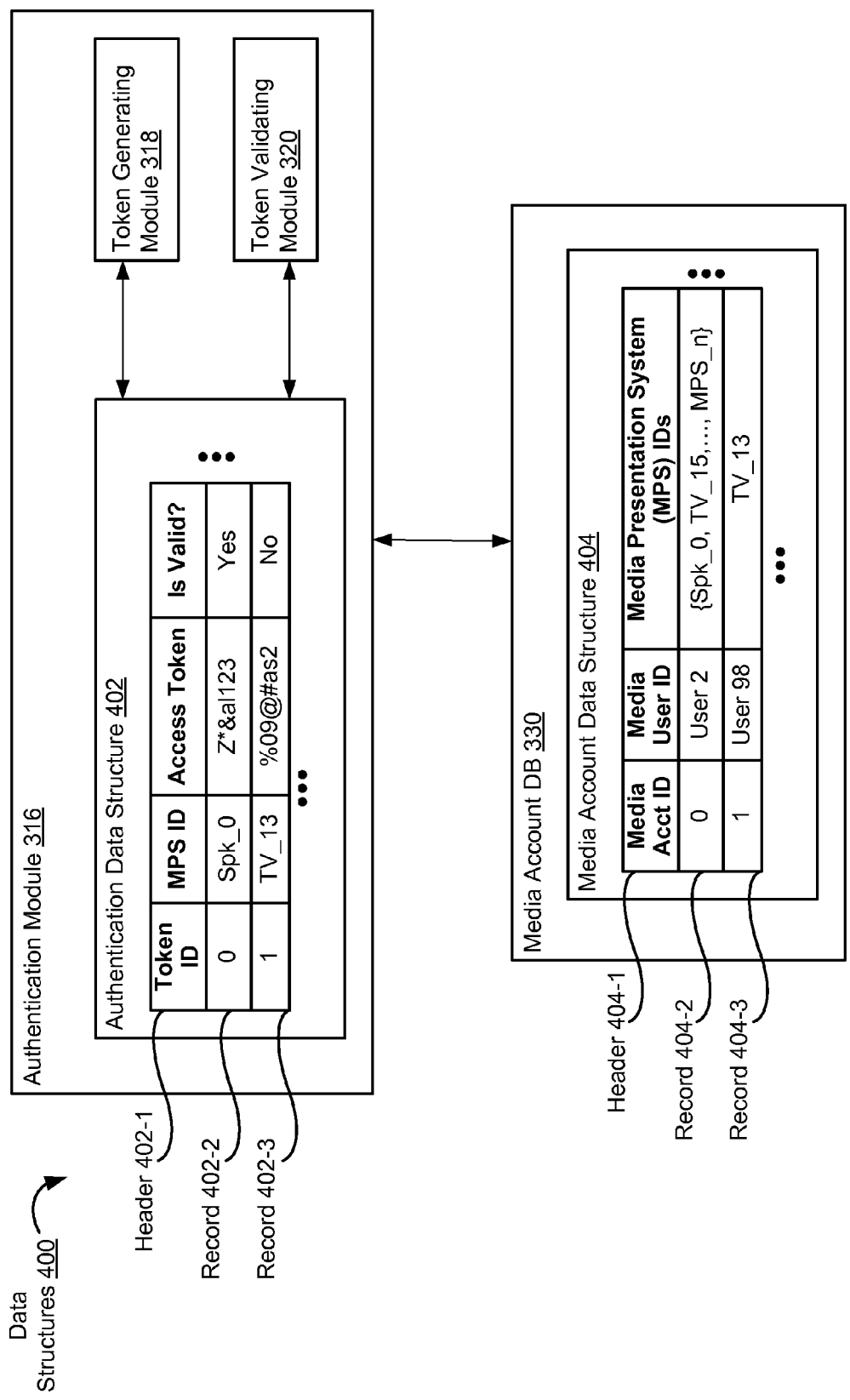
FIG. 4 is a block diagram illustrating an exemplary authentication data structure and an exemplary media account data structure used by the media content delivery system in accordance with some implementations.

FIG. 4 is a block diagram illustrating an authentication data structure 402 in the authentication module 316 and an exemplary media account data structure 404 in the media account database 330, in accordance with some implementations. The authentication data structure 402, in some implementations, contains fields (e.g., each field within header 402-1) for "token ID" (e.g., an identifier to uniquely identify each record 402-2, 402-3, etc. contained within the authentication data structure 402), "MPS ID" (e.g., an identifier corresponding to a respective media presentation system or to a plurality of media presentation systems), "access token" (e.g., an authentication token used to provide client devices with access to media presentation systems that correspond to the authentication token), and "is valid?" (e.g., an indication as to whether a respective access token is still valid). The media account data structure 404, in some implementations, contains fields (e.g., each field within header 404-1) for media acct ID (e.g., a unique identifier for each record 404-2, 404-3, etc. in the media account data structure 404), media user ID (e.g., an identifier associated with a user, which could be a user-created username or some other appropriate identifier), and MPS IDs (e.g., a set of identifiers corresponding to media presentation systems that are associated with the user).

In some implementations, a content provider may require that a respective media presentation system be associated with a particular user account (or user accounts) before it will allow that device to receive content from the content provider. In some implementations, a user must provide login credentials (e.g., a username and password) to a media presentation system so that the media presentation system can, in turn, authenticate itself and/or the user to the content provider (e.g., through media content server 104). (Alternatively, the user provides login credentials to the media content server 104.) After authenticating, the user can direct media content associated with his or her account to the media presentation system.

Moreover, by ensuring that respective media presentation systems 108 are associated with at least one particular user account, the media content provider can implement rules and policies relevant to the particular user account, and allow access to account-specific data that is associated with the particular user account. For example, the media content provider can enforce access limits that apply to that particular account as it would with any other media presentation system associated with that user and/or user account. Thus, if a user has already consumed a maximum allotment of media content, the user will be unable to send additional media content to media presentation systems. Also, account-specific data, such as stored playlists, "favorite" content items, currently playing content, and the like, are all available through the media content server 104

As a specific example, a user may setup a network-connected television (e.g., television 108-2 of FIG. 1) as a media presentation system. The media content provider can then associate the television with the account of a user in the media content server 104, by adding or updating a record (e.g., record 404-3) in the media account data structure 404. For example, if User 98 is not yet associated with any media presentation systems, then the media content server 104 (or a component of media content server 104, e.g., authentication module 316) adds record 404-3 to the media account data structure 404 (in this example, the television 108-2 has an MPS ID of TV_13, so record 404-3 of media account data structure 404 contains an MPS ID of TV_13 in the MPS IDs field). By way of general illustration, in some implementations, if User 98 shares access to TV_13, but then the access token associated with TV_13 is later invalidated, authentication module 316 updates a record in authentication data structure 402 to reflect invalidation of the access token (e.g., record 402-3 indicates that the access token for TV_13 is not valid).

As an additional example, User 2 may decide to allow other users to access media presentation systems associated with User 2. For example, if User 2 shares access to the speaker associated with MPS ID of Spk_0 (e.g., creates a hotspot associated with Speaker 108-1 of FIG. 1), then the authentication module 316 communicates with media account database 330 (e.g., sends a SQL query to media account database 330, or a component thereof, and receives a record based on the query in response) to verify that User 2 is associated with Spk_0 (e.g., checking that record 404-2 associated with User 2 has an entry in the MPS IDs field for Spk_0). In accordance with a determination that User 2 is authorized to use Speaker 108-1, the authentication module 316 accesses the token generating module 318, in order to create an access token corresponding to Speaker 108-1. In accordance with some implementations, the authentication module 316 adds a new record (e.g., record 402-2) to authentication data structure 402 including the MPS ID (e.g., Spk_0), the generated access token, and an indication that the token is valid.

Although FIG. 4 illustrates data structures 400 as tables, the data structures 400 may include a SQL database, a spreadsheet, an XML file, a desktop database, a flat file, a CSV file, and/or other organized data source. Some implementations support combined or blended sources for each data structure, with data from two or more distinct sources.

Figure 5A:
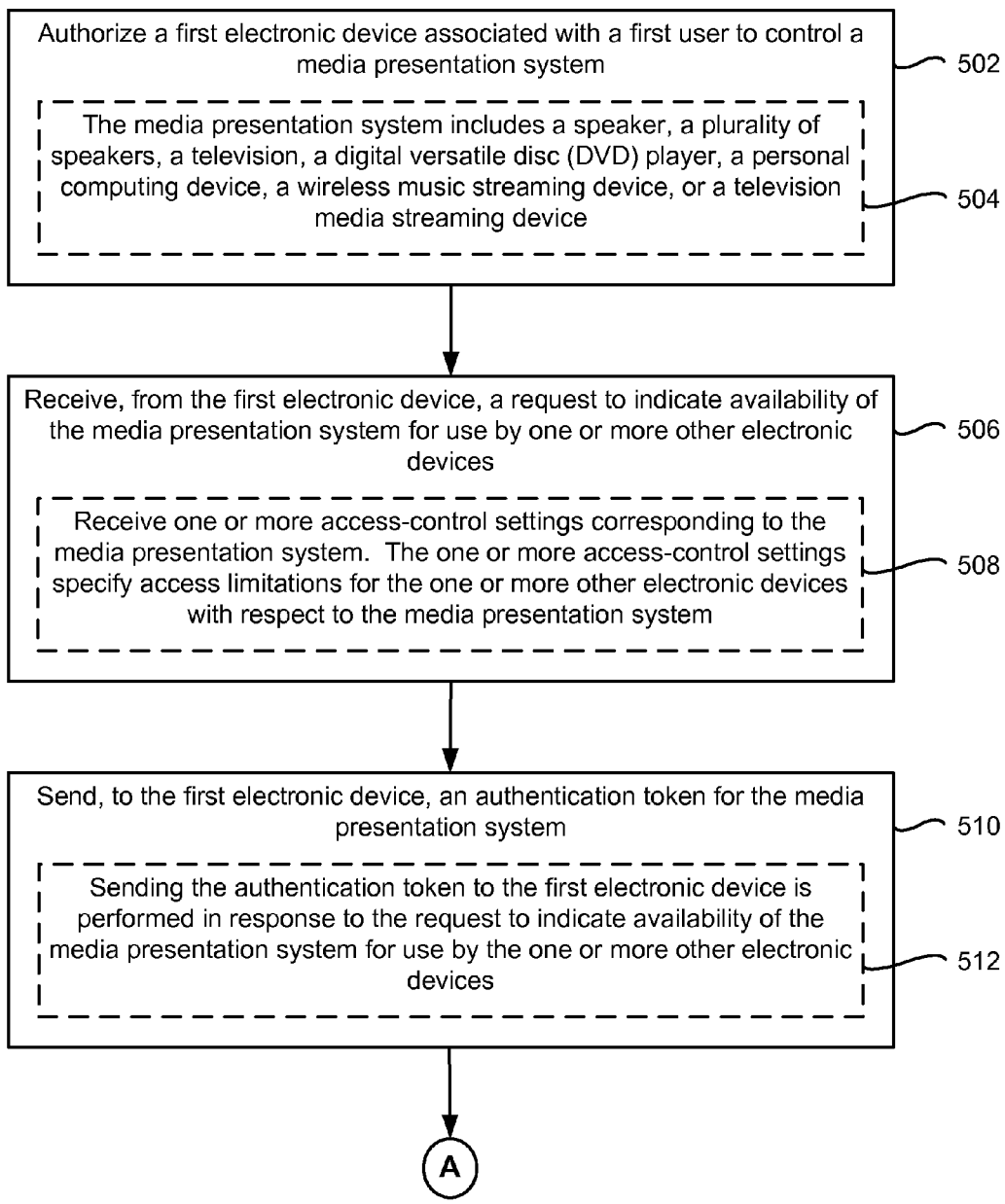
FIGS. 5A-5C are flow diagrams illustrating a method of controlling media presentation in accordance with some implementations.
Figure 5B:
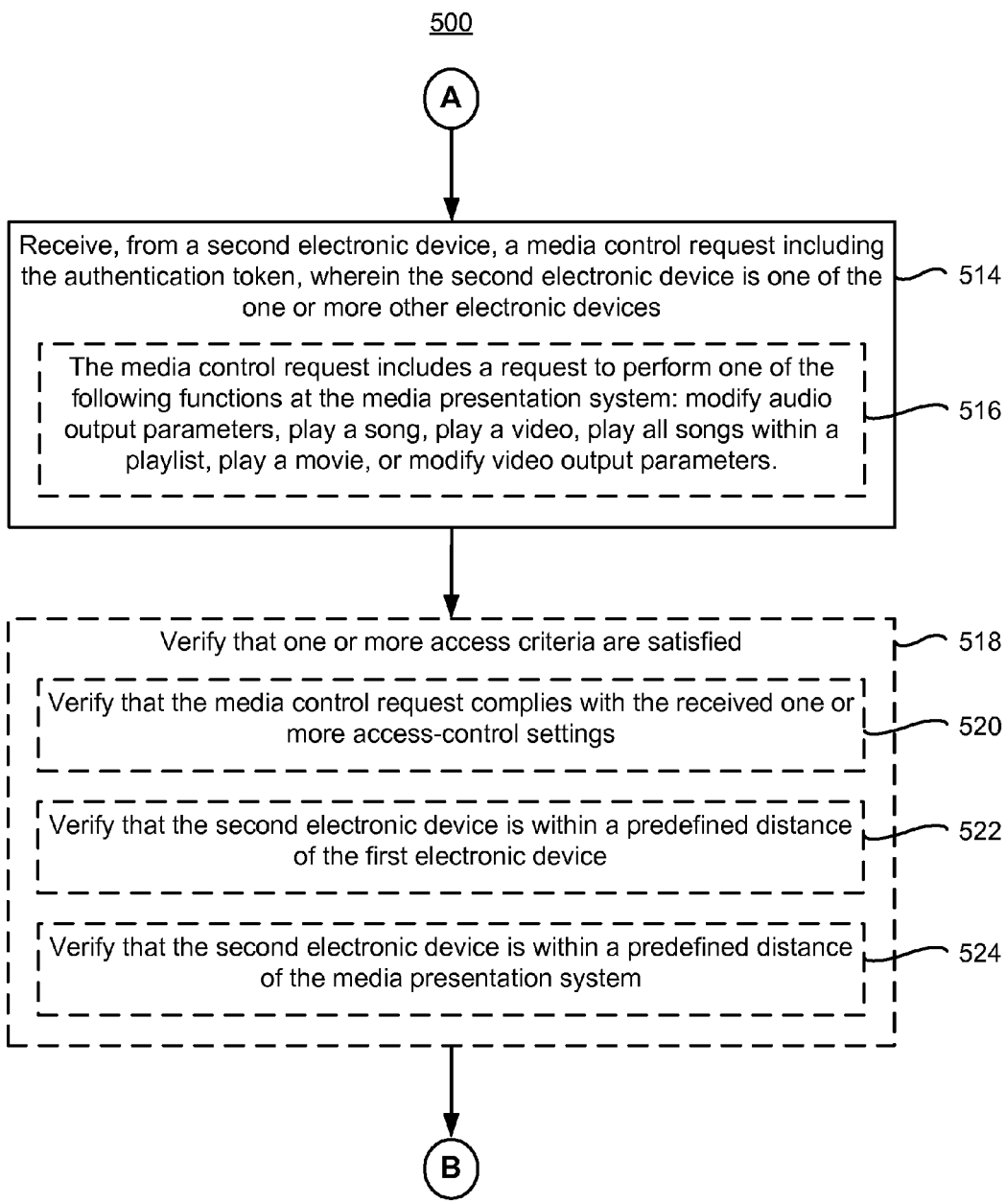
Figure 5C:
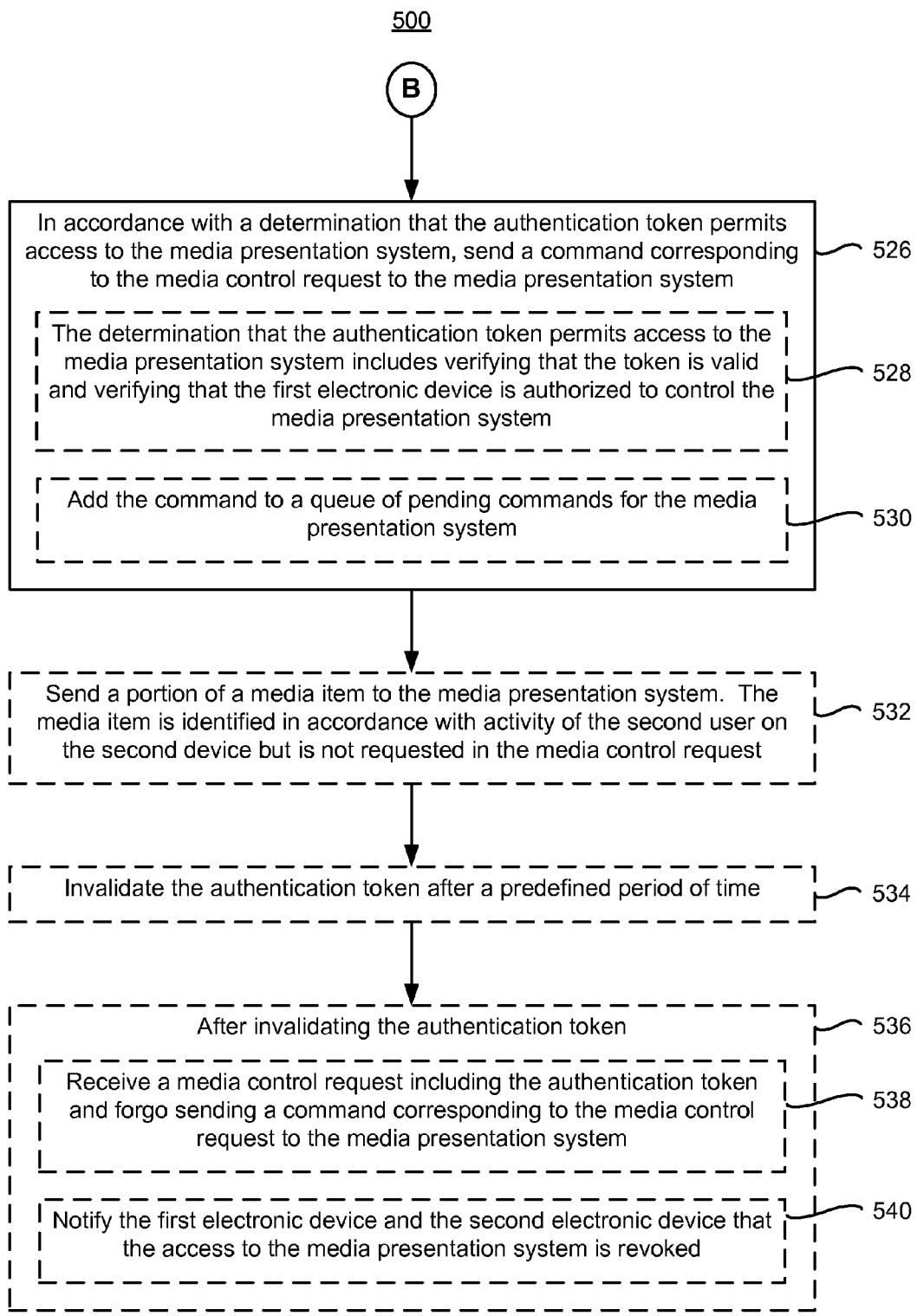

FIGS. 5A-5C are flow diagrams illustrating a method 500 of controlling media presentation in accordance with some implementations.

The method 500, in accordance with some implementations, is performed by a server system (e.g., media content server 104, FIGS. 1 and 3). FIGS. 5A-5C correspond to instructions stored in a computer memory or other computer-readable storage medium (e.g., memory 306 of the media content server 104, FIG. 3).

Referring now to FIG. 5A, the server system (e.g., media content server 104) authorizes (502) a first electronic device associated with a first user (e.g., client device 102-1) to control a media presentation system (e.g., speaker 108-1). This authorization occurs, for example, when the first user first sets up the media presentation system or when the first user logs into the media content provider associated with the media content server 104. In some implementations, control of the media presentation system is through the media content server 104 (e.g., client device 102-1 controls speaker 108-1 by sending media control requests to the media content server 104 and a command corresponding to each media control request is later sent, by media content server 104 or a component thereof, to speaker 108-1). If client device 102-1 and speaker 108-1 are on (e.g., connected to) the same network (e.g., WiFi network) the client device 102-1, in some implementations, can send a media control request both to the media content server 104 and directly to the speaker 108-1, since this allows for faster response times (e.g., the delay time between sending the media control request and playback of a requested new song or other content included in the media control request is reduced). In some implementations, however, the client device 102-2 is not on the same network (e.g., WiFi) as the speaker 108-1. For example, a guest may not have access to the wireless (e.g., WiFi) network of a party host. As such, the client device 102-2, in these implementations, only sends media control requests to the media content server 104 and does not send media control requests directly to the speaker 108-1.

The media presentation system, in some implementations, includes (504) a speaker, a plurality of speakers, a television, a digital versatile disc (DVD) player, a personal computing device, a wireless music streaming device, or a television media streaming device. The media presentation system, in some implementations, includes more than one type of component media presentation system (e.g., a plurality of speakers, a television, and a DVD player, as shown in media presentation systems 108 of FIG. 1). As an additional example, in some implementations, the media presentation system may include a USB device enabling wireless connectivity for a television (or for any other type of media presentation system) or a device (e.g., light emitting diode (LED) lamp) with a built-in network-compatible (e.g., WiFi) speaker.

In some implementations, the server system receives (506), from the first electronic device, a request to indicate availability of the media presentation system (e.g., a single speaker or a plurality of speakers) for use by one or more other electronic devices. Indicating availability of the media presentation system for use by one or more other electronic devices is referred to as creating a hotspot for control of the media presentation system. In some implementations, the request from the first electronic device is generated after the first user of the first electronic device selects (e.g., with a touch-based gesture such as a drag, an extended tap, or a momentary tap on user interface 204 of client device 102, FIG. 2) an affordance (e.g., an icon, slide bar, etc.) displayed on the first electronic device (e.g., displayed by media presentation sharing module 230 of media application 222, FIG. 2). The affordance in these implementations may contain text indicating that selecting the affordance will create a hotspot for media control that will allow other users to use the media presentation system (e.g., a "share" button for requesting to indicate availability of a single media presentation system (such as hotspot activation affordances 602, FIG. 6A) and/or a "Share All" button for requesting to indicate availability of a plurality of media presentation systems (such as share-all affordance 604, FIG. 6A)). Consistent with these implementations, the first user may be asked to affirmatively agree (e.g., click or tap on a displayed "I agree" button on user interface 204 of client device 102) to allow other users to use the media presentation system.

Figure 6A:
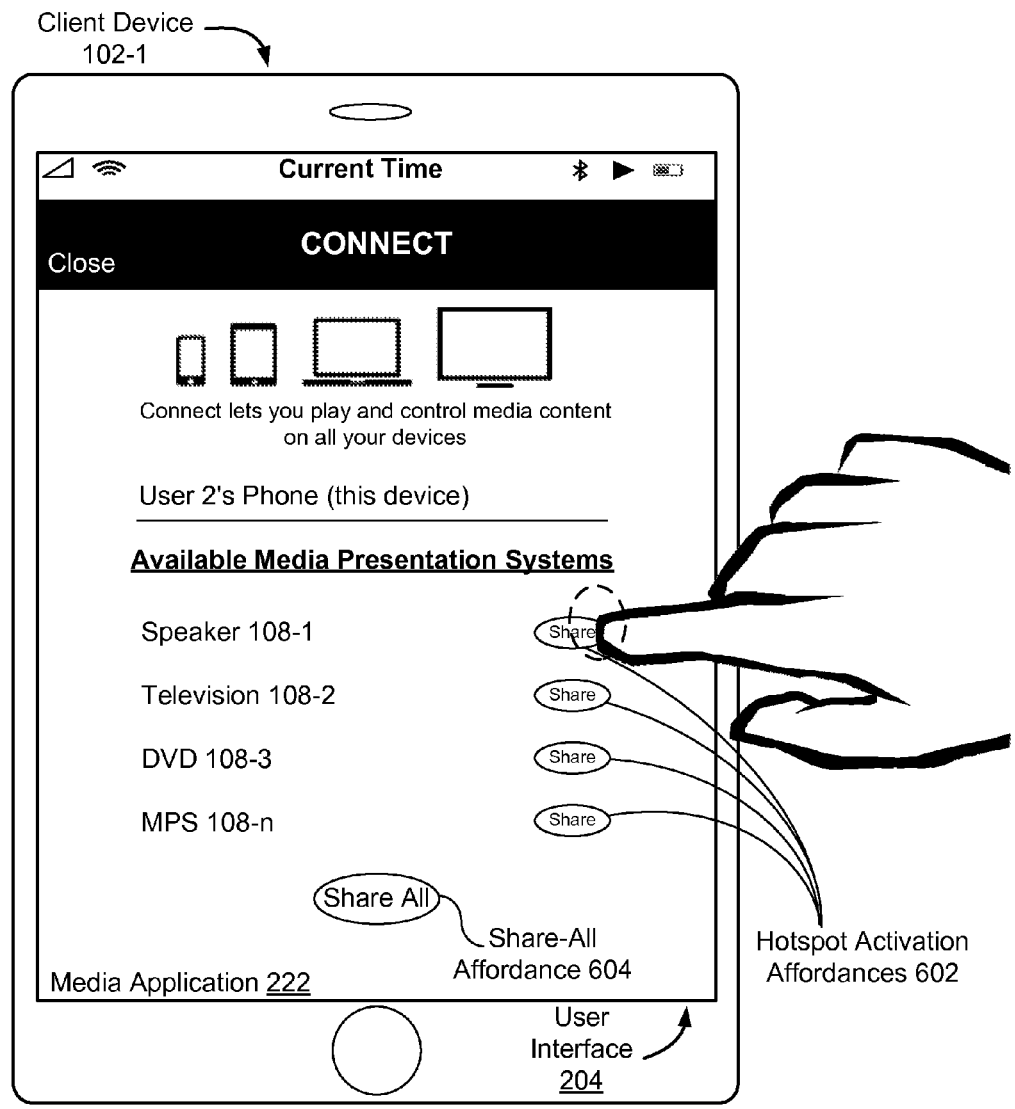
FIGS. 6A, 6B, and 7 show graphical user interfaces used to share access to a media presentation system in accordance with some embodiments.
Figure 6B:
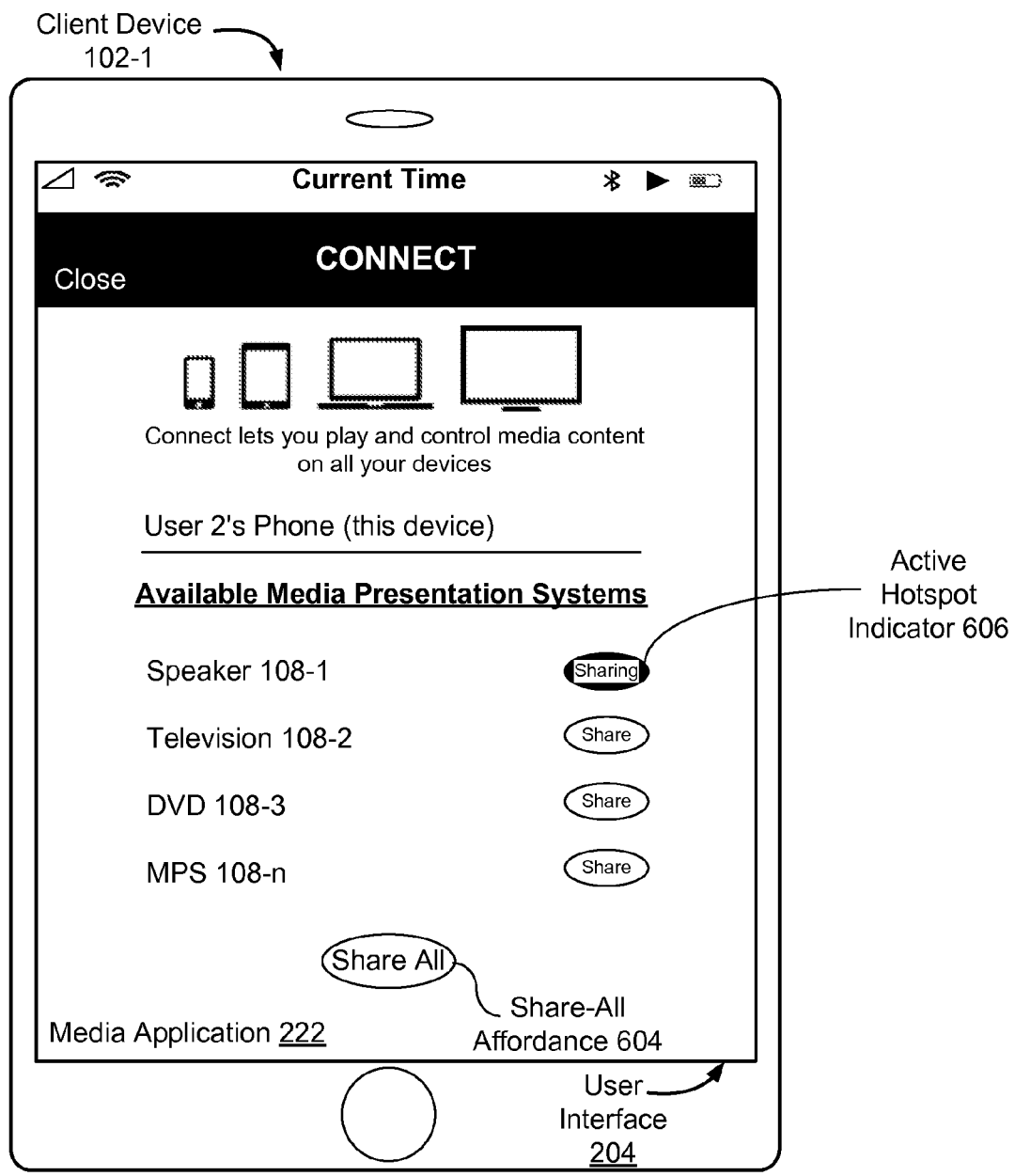

As a specific example, with reference to FIG. 6A, the first user clicks on a respective hotspot activation affordance 602, in order to create a hotspot for the corresponding media presentation system (in this example, speaker 108-1). After the hotspot has been created, media application 222 of user interface 204 (or a component of media application 222, such as media presentation system sharing module 230), in some implementations, is updated to indicate that a hotspot has been created for speaker 108-1 (e.g., media application 222 removes the hotspot activation affordance 602 corresponding to speaker 108-1 and displays an active hotspot indicator 606 (e.g., a highlighted button with the text "Sharing"), as shown in FIG. 6B). In some implementations, media application 222, as displayed on user interface 204, also includes a share-all affordance 604 that allows the first user to create a hotspot for all of the first user's available media presentation systems. In some implementations, if the first user selects (e.g., taps on) the displayed "Share All" affordance 604 then client device 102-1 (or in some implementations media content server 104) creates a hotspot that includes all of the first user's available media presentation systems (e.g., the hotspot and the associated token that permits access to the hotspot, in this example, would correspond to speaker 108-1, television 108-2, DVD 108-3, and media presentation system 108-n).

Figure 7:
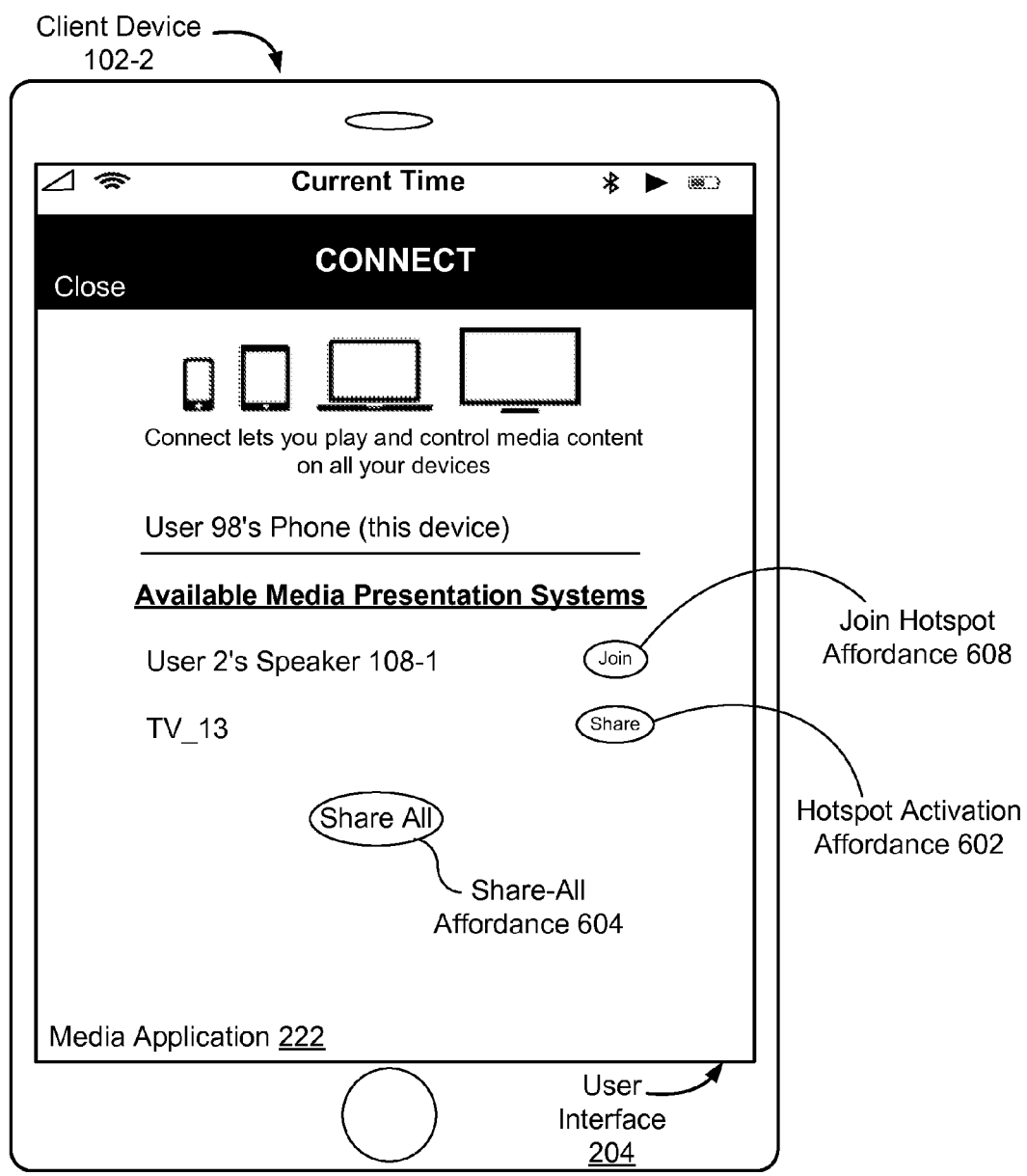

Turning now to FIG. 7 and continuing with the specific example, after the first user creates a hotspot, other users are able to use the media presentation systems associated with the first user's created hotspot. For example, after the first user creates a hotspot including speaker 108-1, then when another user (e.g., a second user of client device 102-2) accesses media application 222 of client device 102-2, the displayed interface (e.g., on user interface 204 of client device 102-2) includes a join hotspot affordance 608 corresponding to another user's media presentation system(s) (e.g., user 2's speaker 108-1, as pictured in FIG. 7). In some implementations, the join hotspot affordance 608 is not associated with a single media presentation system, but is instead associated with all of the media presentation systems associated with a user (e.g., if the hotspot associated with join hotspot affordance 608 was created using a share-all affordance (such as share-all affordance 604, FIG. 6A), then instead of displaying "User 2's Speaker 108-1," the descriptive text next to the join hotspot affordance 608 displays, for example, "User 2's Hotspot" or "Share Control of all of User 2's Media Presentation Systems"). In some implementations, the client device 102-1 transmits (e.g., broadcasts) a message indicating availability of the created hotspot and the client device 102-2 detects the created hotspot (or the transmitted message) through a wireless networking technology (e.g., Bluetooth, Bluetooth Low Energy, WiFi, Multicast DNS, or Apple Multipeer connectivity). After the client device 102-2 detects the created hotspot, in some implementations, the user interface 204 of client device 102-2 is updated (e.g., by user interface module 220) to display the join hotspot affordance 608 (e.g., within media application 222). Alternatively, the client device 102-1, in some implementations, displays a QR code associated with the created hotspot on the user interface 204 of client device 102-1 and the client device 102-2 scans the code in order to receive the authentication token (e.g., as described in more detail with respect to FIGS. 5A-5C) and begin using the media presentation system (e.g., speaker 108-1).

The second user of client device 102-2 is able to select (e.g., tap on) the join hotspot affordance 608 in order to send a request to client device 102-1, media content server 104, or some other device responsible for managing requests to join hotspots. In some implementations, as discussed in more detail with reference to FIGS. 5A-5C, the request is sent to client device 102-1 and, after a user of client device 102-1 approves the request to join the hotspot, client device 102-1 sends an authentication token to client device 102-2. After receiving the authentication token, in some implementations, the client device 102-2 is able to use the media presentation system(s) associated with the hotspot (e.g., client device 102-2 is able to send media control requests including the authentication token to media content server 104, and then media content server 104 generates a command corresponding to the media control request which is then sent to speaker 108-1).

In some implementations, the server system receives (508) from the first electronic device one or more access-control settings corresponding to the media presentation system. The one or more access-control settings specify access limitations for the one or more other electronic devices with respect to the media presentation system. The one or more access control settings may include restrictions on changing audio output parameters (e.g., volume, bass, or equalizer settings), turning off the media presentation system, or restrictions on sending certain types of media content to the media presentation system (e.g., media items containing vulgar content). For example, the one or more access-control settings may prohibit the one or more other electronic devices from shutting off the media presentation system, adjusting volume of the media presentation system beyond a predefined threshold volume, and/or violating restrictions on media content (e.g., playing media content with vulgar language, etc.). The one or more access-control settings, in some implementations, are selected by the first user of the first electronic device. In some implementations, as part of creating the hotspot, the first user of the first electronic device selects the one or more access-control settings from a menu that is displayed (on user interface 204 of client device 102) by the media presentation sharing module 230 of media application 222 (FIG. 2). In some implementations, the access-control settings are selected before the first user creates a hotspot for media control at the media presentation system (e.g., the access-control settings could be selected automatically by media application 222 based on a usage pattern associated with the first user). In some embodiments, the access-control settings are determined by the server system (e.g., based on a usage pattern associated with the first user).

In some implementations, the server system sends (510), to the first electronic device, an authentication token for the media presentation system (e.g., token generating module 318 of authentication module 316 generates a unique authentication token for the media presentation system that is then sent to the first electronic device). In some implementations, sending the authentication token to the first electronic device is performed in response to the request to indicate availability of the media presentation system for use by the one or more other electronic devices (512). Alternatively, the authentication token was previously sent to the first electronic device (e.g., during the authorization 502). In other alternative implementations, the first electronic device (e.g., client device 102-1) generates the authentication token (e.g., using authentication module 224) for the media presentation system and sends the authentication token to the media content server 104 for storage in authentication data structure 402.

Referring now to FIG. 5B, in some implementations, the server system receives (514), from a second electronic device (e.g., client device 102-2 of FIG. 1), a media control request including the authentication token, wherein the second electronic device is one of the one or more other electronic devices. In some implementations, the second electronic device received the authentication token from the first electronic device after requesting access to the media presentation system (i.e., after requesting access to the hotspot). The authentication token is transmitted from the first electronic device to the second electronic device using, for example, a website link, a social-networking link, Quick Response (QR) codes, Bluetooth, Wireless Fidelity (WiFi), Multicast DNS (mDNS), or Apple Multipeer Connectivity.

In some implementations, prior to transmitting the authentication token from the first electronic device to the second electronic device, the first user of the first electronic device approves requests from the one or more other electronic devices (e.g., the second electronic device) to access the media presentation system. For example, the second electronic device transmits a request to the first electronic device, which the first user accepts or denies. Approving requests, in some implementations, may include granting each device a different level of access to the media presentation system and/or defining access-control settings applicable for each approved device/request.

The media control request may include (516) a request to perform one of the following functions at the media presentation system: modify audio output parameters, play a song, play a video, play all songs within a playlist, play a movie, or modify video output parameters. In some implementations, audio output parameters include volume, bass, treble, equalizer settings (for various frequency ranges), settings for transitioning between songs, and others. In some implementations, video output parameters include refresh rate, aspect ratio, resolution, brightness, contrast, and others.

In some implementations, the server system verifies (518) that one or more access criteria are satisfied. More specifically, in some implementations, the server system verifies one or more of the following: 1) verifies (520) that the media control request complies with the received one or more access-control settings; 2) verifies (522) that the second electronic device is within a predefined distance of the first electronic device (or within a predefined region that includes the first electronic device); and 3) verifies (524) that the second electronic device is within a predefined (e.g., a threshold) distance of the media presentation system (or within a predefined region that includes the media presentation system). In some implementations, the command corresponding to the media control request is sent (526, below) in response to satisfying one or more of the above verifications.

In some implementations, the predefined distance used in the above verifications is defined by the first user of the first electronic device. In some implementations, a default value for the predefined distance is retrieved by the server system. In some implementations, the server system retrieves the default value for the predefined distance and modifies the default value in accordance with a usage pattern associated with the first user (e.g., based on distances between the first electronic device and other electronic devices that previously connected to the media presentation system or based on distances between the media presentation system and other electronic devices that previously connected to the media presentation system).

Any device or combination of devices can be used to determine whether the first electronic device (e.g., client device 102-1) and the second electronic device (e.g., client device 102-2) are within the predefined distance of one another. For example, in some implementations, the first electronic device and the second electronic device each send their respective location information to the media content server 104, and the media content server 104 determines whether the first electronic device and the second electronic are within the predefined distance (e.g., within 5, 10, 25, or 50 feet, or any other appropriate distance) of one another.

In other implementations, the first electronic device and the second electronic device communicate with one another to determine whether they are within the predefined distance of one another. Once it is determined, by either device, that they are within the predefined distance of one another, the second electronic device is then able to send media control requests to the media presentation system (these media control requests, in some implementations, are sent to the media content server 104 and the media content server 104 then sends a command corresponding to the media control request to the media presentation system).

In some implementations, the communication between the first electronic device and the second electronic includes one or both devices exchanging location information (e.g., based on GPS coordinates, triangulation in accordance with wireless signal strengths, or the like). Accordingly, the devices determine their relative proximity (and, thus, whether they are within the predefined distance) based on their detected geographic locations.

Referring now to FIG. 5C, in some implementations, the server system, in accordance with a determination (e.g., by the server system) that the authentication token permits access to the media presentation system, sends (526) a command corresponding to the media control request to the media presentation system. In some implementations, the media request processing module 322 of media content server 104 receives the media control request and then determines, selects, or generates a command corresponding to the media control request.

The determination that the authentication token permits access to the media presentation system, in some implementations, includes verifying (528) that the token is valid and verifying that the first electronic device is authorized to control the media presentation system. In some implementations, the server system adds (530) the command to a queue of pending commands for the media presentation system.

In some implementations, the queue of pending commands is maintained and managed by the media content server 104. In alternative implementations, the queue is maintained and managed by the first electronic device, and in still other implementations, the queue is maintained and managed by the media presentation system. In some implementations, the media content server 104 determines which device is capable of managing and maintaining the queue (e.g., based on bandwidth constraints, CPU resources available, etc). In yet other implementations, the queue of pending commands is jointly maintained and managed by the media content server 104, the first electronic device, and the media presentation system (e.g., portions of the queue are managed and maintained by each device).

In some implementations, the server system sends (532) at least a portion of a media item to the media presentation system. The media item is identified in accordance with activity of the second user on the second device but is not requested in the media control request. In some implementations, the portion of the media item is sent after the second user of the second electronic device hovers over (e.g., with a touch-based gesture, a stylus, or with a cursor) the media item for more than a predefined amount of time (e.g., 5 seconds, 10 seconds, etc.). For example, the media content server 104 (or, alternatively the second electronic device) determines or is informed that the second user of the second electronic device is likely to select a particular media item for playback (e.g., based on a determination that the second user has been browsing the particular media item for more than a threshold amount of time), and, in response, sends at least a portion (e.g., a pre-fetched, cached portion, or preview portion) of the particular media item to the media presentation system. In some implementations in which the media presentation includes a plurality of media presentation systems (e.g., because a user created a hotspot using share-all affordance 604, FIG. 6A), then the portion of the particular media item is sent to each respective media presentation system within the plurality of media presentation systems. Accordingly, in some implementations, user behavior and/or interactions with client device 102 (e.g., the second electronic device) cause the media content server 104 to pre-fetch media content that may be played back at a later time and/or in response to another media control request (which may be generated without user input or in response to a user input). The prefetched content is sent to the media presentation system, where it is cached.

In some implementations, the server system invalidates (534) the authentication token after a predefined period of time (e.g., 1 hour, 5 hours, 1 day, 3 days, 1 week, etc.). The predefined period of time, in some implementations, is calculated (by media content server 104 or by client device 102) based on usage history or stored preferences of a particular user (e.g., the first user of the first electronic device). For example, if a usage history (e.g., an additional field in media account data structure 404) associated with the first user of the first electronic device indicates that the authentication token should expire within two hours (e.g., the usage history could be used to calculate an average length of time for the first user's social gatherings or an average or maximum amount of time that the first user has left a media control hotspot open for), then the predefined period of time is set as two hours. In other implementations, the predefined period of time is configured by the first user of the first electronic device (e.g., using an interface presented by the media presentation system sharing module 230 of media application 222). Additionally, in some implementations, the first user of the first electronic device destroys a hotspot associated with the authentication token (e.g., by interacting with the media presentation sharing module 230 of media application 222) and thus revokes sharing of a media presentation system (e.g., at the end of a party). For example, with reference to FIG. 6B, a tap by the first user on the "Sharing" button associated with the hotspot for speaker 108-1 destroys the hotspot and initiates the process for invalidating the authentication token associated with speaker 108-1 (e.g., the client device 102-1 sends a message to the media content server 104 indicating that the hotspot has been destroyed and, in response to receiving the message, the media content server 104 updates the "Is Valid?" field of an appropriate record in authentication data structure 402 to reflect invalidation of the authentication token).

In some implementations, the server system revokes authorization of the first electronic device to control the media presentation system and, in response to revoking authorization, invalidates the authentication token. For example, the account of the first user may expire or the first user may transfer ownership of the media presentation system. The server system will revoke authorization because the first user of the first electronic device is no longer associated with the media presentation system. In this example, after revoking authorization of the first electronic device to control the media presentation system, the server system also invalidates the authentication token (if the authentication token for the media presentation is still valid), in order to make sure that any other devices possessing the authentication token cannot continue to send media control requests to the transferred media presentation system.

After invalidating the authentication token (536), the server system performs one or more of the following: 1) receives a media control request including the invalidated authentication token and forgoes sending a command corresponding to the media control request to the media presentation system; and 2) the server system notifies (540) the first electronic device and the second electronic device that the access to the media presentation system is revoked.

Although some of various drawings illustrate a number of logical stages in a particular order, stages which are not order dependent may be reordered and other stages may be combined or broken out. Furthermore, in some implementations, some stages may be performed in parallel and/or simultaneously with other stages (e.g., operations 520, 522, and 524 in FIG. 5B may all be performed together or substantially in parallel). While some reordering or other groupings are specifically mentioned, others will be apparent to those of ordinary skill in the art, so the ordering and groupings presented herein are not an exhaustive list of alternatives. Moreover, it should be recognized that the stages could be implemented in hardware, firmware, software, or any combination thereof.

The foregoing description, for purpose of explanation, has been described with reference to specific implementations. However, the illustrative discussions above are not intended to be exhaustive or to limit the implementations to the precise forms disclosed. Many modifications and variations are possible in view of the above teachings. The implementations were chosen and described in order to best explain the principles and their practical applications, to thereby enable others skilled in the art to best utilize the implementations and various implementations with various modifications as are suited to the particular use contemplated.

What is claimed is:

1. A non-transitory computer-readable storage medium, storing one or more programs configured for execution by one or more processors of a first electronic device distinct from a media presentation system and a server system, the one or more programs comprising instructions for:

receiving, from the server system, authorization for the first electronic device to control the media presentation system;

detecting user input at the first electronic device requesting to indicate availability of the media presentation system for use by one or more other electronic devices that are distinct from the first electronic device;

in response to detecting the user input, transmitting from the first electronic device an indication of availability of the media presentation system for use by the one or more other electronic devices; and in response to receiving a request for access to the media presentation system from a second electronic device of the one or more other electronic devices, transmitting, from the first electronic device to the second electronic device, an authentication token that allows the second electronic device to access the media presentation system through submission to the server system of media control requests that include the authentication token while the first electronic device is also authorized to control the media presentation system.

2. The non-transitory computer-readable storage medium of claim 1, wherein the one or more programs further comprise instructions for receiving the authentication token from a server system.

3. The non-transitory computer-readable storage medium of claim 2, wherein the instructions for receiving the authentication token from the server system comprise instructions for receiving the authentication token in response to the user input.

4. The non-transitory computer-readable storage medium of claim 1, wherein the one or more programs further comprise instructions for generating the authentication token.

5. The non-transitory computer-readable storage medium of claim 1, wherein the instructions for detecting the user input comprise instructions for detecting a gesture in a media-application user interface that is displayed on a touch-sensitive display of the first electronic device.

6. The non-transitory computer-readable storage medium of claim 5, wherein the one or more programs further comprise instructions for:
in response to detecting the user input, updating the media-application user interface to indicate that the media presentation system is available for use by the one or more other electronic devices.

7. The non-transitory computer-readable storage medium of claim 1, wherein the instructions for detecting the user input comprise instructions for receiving one or more access-control settings corresponding to the media presentation system, wherein the one or more access-control settings specify access limitations for the one or more other electronic devices with respect to the media presentation system.

8. The non-transitory computer-readable storage medium of claim 1, wherein the one or more programs further comprise instructions for:
determining whether the second electronic device is within a predefined distance of the first electronic device; and
in accordance with a determination that the second electronic device is within the predefined distance of the first electronic device, permitting the second electronic device to access the media presentation system through the submission of media control requests that include the authentication token.

9. The non-transitory computer-readable storage medium of claim 1, wherein the one or more programs further comprise instructions for:
after transmitting the authentication token to the second electronic device, detecting additional user input requesting to cease indicating availability of the media presentation system for use by the one or more other electronic devices; and
in response to detecting the additional user input, initiating invalidation of the authentication token.

10. The non-transitory computer-readable storage medium of claim 9, wherein the instructions for initiating invalidation of the authentication token comprise instructions for sending a message to a server system indicating that the media presentation system is no longer available for use by the one or more other electronic devices.

11. The non-transitory computer-readable storage medium of claim 1, wherein the one or more programs further comprise instructions for specifying a period of time after which the authentication token is to expire.

12. The non-transitory computer-readable storage medium of claim 1, wherein the one or more programs further comprise instructions for initiating invalidation of the authentication token.

13. The non-transitory computer-readable storage medium of claim 12, wherein the one or more programs further comprise instructions for:
after initiating invalidation of the authentication token, notifying the second electronic device that access to the media presentation system is revoked.

14. The non-transitory computer-readable storage medium of claim 1, wherein the one or more programs further comprise instructions for:
receiving, from the second electronic device, a media control request that includes the authentication token;
verifying that the authentication token is valid; and
in response to the verifying, sending the media control request to a server system.

15. The non-transitory computer-readable storage medium of claim 1, wherein a respective media control request comprises a request to perform one of the following functions at the media presentation system: modify audio output parameters, play a song, play a video, play all songs within a playlist, play a movie, or modify video output parameters.

16. The non-transitory computer-readable storage medium of claim 1, wherein the instructions for transmitting the indication of availability comprise instructions for broadcasting the indication of availability.

17. A method of controlling media presentation, performed at a first electronic device, distinct from a media presentation system and a server system, with a processor and memory storing instructions for execution by the processor, the method comprising:
receiving, from the server system, authorization to control the media presentation system;
detecting user input at the first electronic device requesting to indicate availability of the media presentation system for use by one or more other electronic devices that are distinct from the first electronic device;
in response to detecting the user input, transmitting from the first electronic device an indication of availability of the media presentation system for use by the one or more other electronic devices;
receiving, from a second electronic device of the one or more other electronic devices, a request for access to the media presentation system; and
in response to receiving the request, transmitting, from the first electronic device to the second electronic device, an authentication token that allows the second electronic device to access the media presentation system through submission to the server system of media control requests that include the authentication token while the first electronic device is also authorized to control the media presentation system.

18. A first electronic device that is distinct from a media presentation system and a server system, comprising:
one or more processors; and
memory storing one or more programs which, when executed by the one or more processors, cause the first electronic device to:

receive, from the server system, authorization to control the media presentation system;

detect user input at the first electronic device requesting to indicate availability of the media presentation system for use by one or more other electronic devices that are distinct from the first electronic device;

in response to detecting the user input, transmit from the first electronic device an indication of availability of the media presentation system for use by the one or more other electronic devices; and in response to receiving a request for access to the media presentation system from a second electronic device of the one or more other electronic devices, transmit, from the first electronic device to the second electronic device, an authentication token that allows the second electronic device to access the media presentation system through submission to the server system of media control requests that include the authentication token while the first electronic device is also authorized to control the media presentation system.

* * * * *